United States Patent Office 2,758,059
Patented Aug. 7, 1956

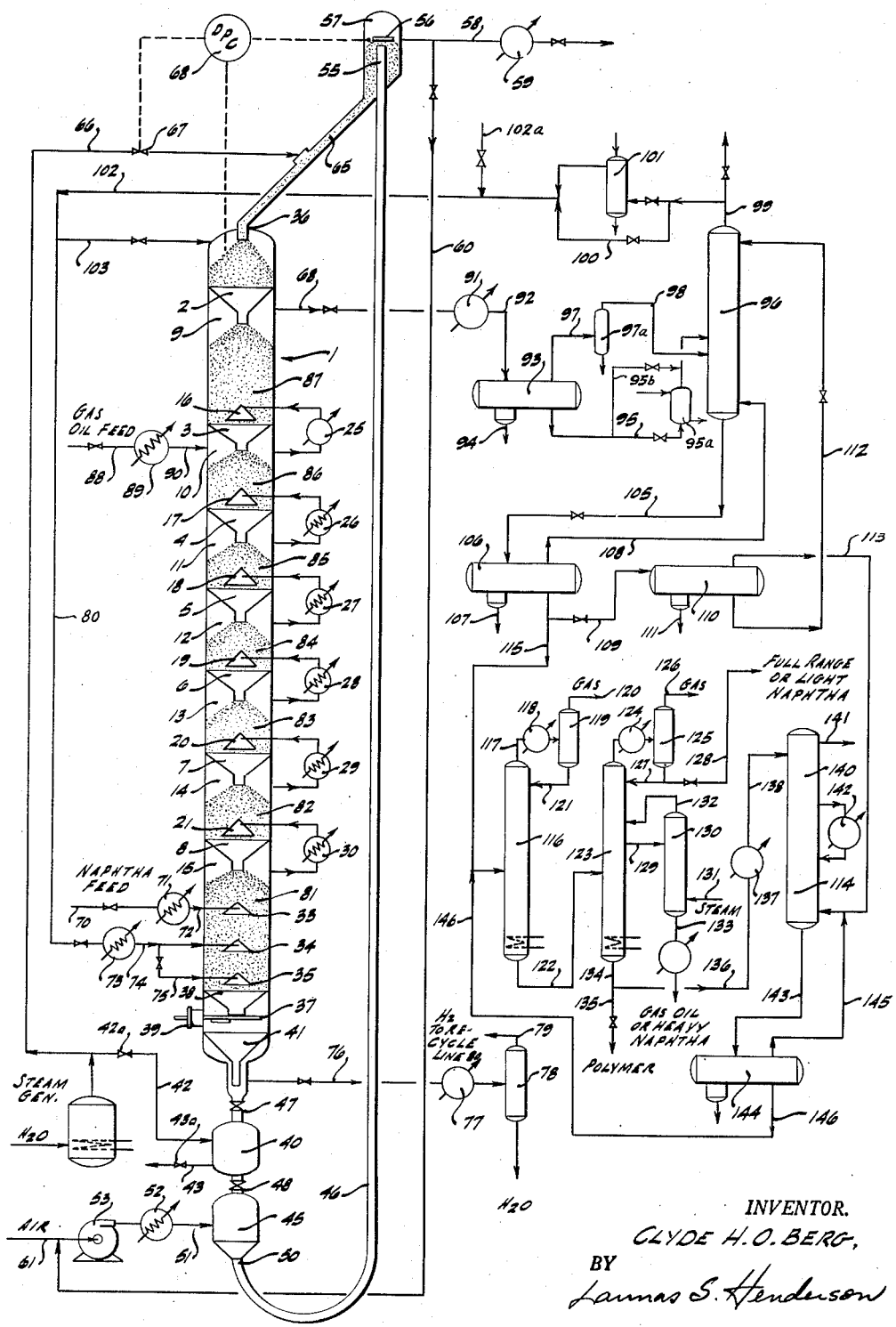

2,758,059

CATALYTIC PROCESS AND APPARATUS FOR REFORMING AND THEN HYDROFINING NAPHTHA USING A COMMON CATALYST

Clyde H. O. Berg, Long Beach, Calif., assignor to Union Oil Company of California, Los Angeles, Calif., a corporation of California Application June 15, 1953, Serial No. 361,517

20 Claims. (Cl. 196—28)

This invention relates to the catalytic conversion of hydrocarbons and in particular relates to the upgrading of petroleum naphthas under controlled temperature conditions to produce high anti-knock gasolines or gasoline blending stocks which are also low in sulfur and nitrogen compounds. Specifically the process relates to a combined reforming-desulfurization procedure in a plurality of conversion zones, one of which is maintained at relatively high temperatures to favor reforming and another of which is maintained at lower temperatures to favor desulfurization. According to a preferred modification of the process a gas oil stock is treated conjointly with the naphtha stock in order to obtain desulfurization of the former in a manner which cooperates with the naphtha conversion to produce heretofore unobtainable beneficial results. The invention is particularly applicable to operations employing moving, compact beds of catalyst. The catalysts employed herein may comprise any of the known metals, metal oxides or sulfides which are known to be active for hydrodesulfurization and hydroforming of hydrocarbon stocks, but is particularly adapted to the used of catalysts comprising composites of molybdenum oxide and cobalt oxide.

Briefly, in broad aspect, the invention consists in vaporizing a feed naphtha, preheating it to a reforming temperature of about 800°–1100° F., admixing therewith gaseous hydrogen, and contacting the mixture under pressure with the catalyst while maintaining the temperature within the stated reforming limits. After the mixture has been substantially reformed it is then passed, at a lower desulfurization temperature, between about 550° and 800° F., over a desulfurization catalyst for a sufficient length of time to permit the removal of sulfur-containing compounds. By this treatment it has been found possible to produce from high-sulfur stocks, a substantially sulfur-free and doctor-sweet reformed gasoline. In the preferred modification the process is conducted in a single reactor in which a downflowing compact stream of granular catalyst is maintained, and wherein the fresh naphtha feed first contacts the nearly spent catalyst at the bottom and passes upwardly countercurrently thereto to contact successively more active catalyst, both in the reforming and the desulfurization zones. It is also preferable to employ a catalyst in the reforming zones which has been partly inactivated in the desulfurization zone; the partly inactivated catalyst has been found to exhibit less cracking tendencies and thereby increases the liquid yield from the reforming zone.

In the specific modification employing conjointly a gas oil feed stock, the process is operated similarly to that described above except that the gas oil is admitted to the reactor at the transition zone between the reforming and desulfurization zones. Thus it will be seen that while naphtha vapors are flowing through the reforming zone, both naphtha and gas oil vapors are passed through the desulfurization zone. In this manner the hydrogen which was produced by aromatization in the reforming zone will be utilized in the desulfurization zones for the hydrocracking of sulfur and nitrogen compounds in the gas oil. This combination is particularly advantageous in moving bed processes wherein the catalyst passes directly from the desulfurization zone to the reforming zone. The catalyst is selectively retarded by the desulfurization in a very advantageous manner for subsequent reforming, resulting in high liquid yields, and at the same time the rising naphtha vapors effect a substantial stripping of adsorbed gas oil from the catalyst. It will be understood that in typical catalytic desulfurization treatments of gas oils considerable difficulty is encountered in stripping the gas oil completely from the catalyst, part of which remains thereon and is lost by combustion when the catalyst is regenerated. Losses in liquid yield amounting to 10% are common from this cause. By the process described herein efficient stripping of gas oil from catalyst is obtained while at the same time the pretreatment of the gas oil conditions the catalyst for the naphtha upgrading in a very advantageous manner.

From the above discussion it will be apparent that the principal object of this invention is to provide methods whereby gasoline or naphtha fractions may be catalytically treated in a differential temperature reactor to obtain an optimum correlation between liquid yield, knock rating increase, and desulfurization.

Another object is to provide convenient methods for preconditioning a catalyst for a hydroforming operation, which preconditioning involves a selective blocking of undesirable cracking centers on the catalyst.

Another objective is to provide an essentially unitary conversion treatment whereby naphtha stocks may be reformed and desulfurized and rendered doctor-sweet without subsequent treatment.

Still another object is to provide catalysts which are particularly adapted for combined desulfurization-reforming operations.

A still further object is to provide methods for desulfurizing gas oils in conjunction with the desulfurization-reforming of naphtha whereby a single continuous unit may be employed to accomplish both objects.

A specific object is to provide convenient methods for stripping or desorbing gas oils from adsorbent desulfurization catalysts. A further object is to provide economical and convenient methods for the utilization of the hydrogen produced in reforming operations.

Still another object of the invention is to provide means for obtaining optimum temperature profiles in the reactor whereby substantially isothermal conditions may be maintained both in the endothermic reforming zone, and the exothermic desulfurization zone, whereby substantially increased liquid yields are obtained.

Another object is to provide a high pressure catalytic conversion process utilizing a moving bed of catalyst passing through the respective conversion zones in substantially compact form without the use of moving mechanical equipment.

A further object is to provide a suitable conveyance zone wherein the spent catalyst may be simultaneously regenerated while being conveyed as a compact bed from the reforming zone to the desulfurization zone.

It is an additional object to provide novel apparatus to accomplish the foregoing objects. Other objects and advantages of the present invention will become apparent as the description proceeds.

The catalytic reforming of petroleum naphtha in the presence of hydrogen to improve its knock rating and decrease its sulfur content is now a fairly widely used process in petroleum refining. In such processes various cracked and straight run naphthas, or mixtures thereof, may be vaporized, admixed with from 500 to 10,000 s. c. f. of hydrogen per barrel of feed stock, and passed at 900–1100° F. over, or through, a bed of the desired catalyst. The catalyst in the reaction zone is contacted with the feed vapors until partial deactivation occurs, as for example by coking, and then the catalyst is regenerated to restore its activity. This procedure in general effects a substantial conversion of naphthenic hydrocarbons to aromatics by dehydrogenation, converts paraffin hydrocarbons to ring compounds by cyclization, effects other isomerization reactions which are not fully understood, all of which tend to increase the knock rating of the gasoline and also increase its lead susceptibility. At the same time sulfur and nitrogen containing compounds may be partially decomposed to produce hydrogen sulfide, ammonia and hydrocarbon remnants. Naphthas which originally contained 0.5% to 4.0% sulfur may be reduced in sulfur content to as little as 0.01% by conventional reforming processes. However, this small amount of remaining sulfur is generally at least partly in the form of mercaptans, or mercaptan precursors such as free sulfur. Such reformates are nearly always sour to the doctor test, or become sour upon storage. The doctor test, as is well known in the art, is sensitive to as little as one part of mercaptan sulfur in 100,000 parts of distillate, and distillates which contain more than about 0.0003% mercaptan sulfur are generally considered sour, and are therefore subjected to sweetening procedures such as alkaline washing and/or doctor treatment.

In the present case it has been found that if the vapors emerging from the reforming operation are contacted with additional catalyst at lower temperatures than in the reforming zone, the final effluent may be doctor-sweet, and due to the absence of free sulfur, will remain doctor-sweet upon storage. The reason for this phenomenon is not understood with any degree of certainty. One hyphothesis is that the low temperature desulfurization following the high temperature reforming is simply more favorable thermodynamically, driving the hydrodesulfurization equilibrium toward the hydrogen sulfide end product. According to other hypotheses the relatively cooler catalyst may act as a selective adsorbent which adsorbs free sulfur and/or high molecular weight sulfur compounds which may be formed by polymerization in the reforming zone. If a moving bed of catalyst is employed flowing countercurrently to the vapors, there will be an effective reflux of adsorbed sulfur or sulfur compounds downwardly toward the reforming zone where they are again desorbed, and this refluxing may proceed until the sulfur contaminants are eventually converted to hydrogen sulfide which may be easily removed from the effluent by oil absorption, water or alkaline washing. However, the present invention is not limited to any such hypothetical explanations, but to the actual procedures described which have been found to give the desired results.

The preferred mode of operation may perhaps be more readily understood by reference to the accompanying figure which is a partly schematic flowsheet of the process. The principal piece of apparatus employed consists of an elongated, tubular metal reactor 1. This reactor may be of any desired size, ranging from small units 15–20 feet in height and 8 inches to 2 feet in diameter, to large-scale units which may range in size from 50–200 feet in height and 2–16 feet in diameter. The vessel should preferably be constructed of iron, steel, or other structural metal capable of withstanding temperatures up to 1200° F. and pressures up to 500 p. s. i. g. or more.

In the modification illustrated a series of longitudinally spaced, funnel-shaped horizontal dividers 2, 3, 4, 5, 6, 7 and 8 are provided in order to provide a series of subjacent gas disengaging zones 9, 10, 11, 12, 13, 14 and 15 respectively. The upper peripheries of these dividers form gas-tight junctions with the walls of the reactor, as for example by continuous welds. The lower portions of the dividers form constricted, depending sealing legs through which the catalyst flows, and which present considerable resistance to the upward flow of gases. A series of inverted, hollow conical gas distributors 16, 17, 18, 19, 20 and 21 are positioned one immediately above each of the dividers. A series of heat exchangers 25, 26, 27, 28, 29 and 30, which may be of any conventional design, are positioned longitudinally along the outside of the reactor, each in cooperation with one of the gas disengaging zones and the gas distributing cone immediately above. It will be seen that, since the gas pressure drop through each of the heat exchangers will be less than that through the solids in the sealing legs, the major portion of the upwardly rising gases will be disengaged in each respective gas disengaging zone and will pass through a heat exchanger and back into the gas distributing cone immediately above. The relative amounts of gases which rise through each heat exchanger and the corresponding sealing leg may be altered at will by varying the cross-sectional area, or length of the sealing leg and/or by varying the pressure drop across each heat exchanger. The pressure drop across the heat exchangers may be varied for example by employing pressure-controlled valves therein, or by installing pumps in the lines connecting the heat exchangers with the reactor. It is preferable to divert a major portion of the rising gases through each heat exchanger in order to avoid the alternative necessity for heating small increments thereof to excessively high temperatures. In this manner substantially any desired temperature profile may be maintained in the reactor 1.

Positioned below the lowermost divider 8 is a series of inverted, conical gas engaging members 33, 34 and 35 which may be employed to inject gaseous feed stock, recycle gases, stripping gases, etc. as will be more particularly described hereinafter.

In the apparatus illustrated, granular solids enter the top of reactor 1 through a solids inlet conduit 36, and gravitate downwardly through each of the sealing legs and around each of the gas distributing elements, and are finally discharged from the reactor by means of a laterally reciprocating feeder plate 37 which cooperates with the lower outlet of a funnel shaped feeder 38. Feeder plate 37 is actuated cyclically at the desired time intervals by a control element 39. Feeder plate 37 consists essentially of a disc with one or more circular openings therein which registers cyclically with the lower end of feeder 38 to allow solids to fall intermittently into a funnel shaped surge zone 41. The detailed construction of one modification of feeder plate assembly 37 is more particularly described in my prior U. S. Patent No. 2,542,214.

From the surge chamber 41 the solids pass downwardly into a solids induction system which is designed to transfer the solids from the relatively low pressure zone in the reactor to a high pressure solids induction chamber 45, cooperating with a particular type of high pressure gas lift line 46 to be more particularly described hereinafter. The intervening vessel 40 is essentially a lock vessel which is provided with a valved inlet 47 and valved outlet 48. The valves 47 and 48 are automatic, gas-tight cycle valves which open and close automatically and out of phase with each other in such manner as to admit solids to chamber 40 while that chamber is at the reaction zone pressure and to discharge solids to induction chamber 45 when valve 47 is closed, thereby preventing backflow of high pressure lift gases into the reaction zone.

Lock vessel 40 is alternately pressured to the lift line pressure and depressured to the reaction zone pressure, whereby surge zone 41 is always maintained at the reaction zone pressure and induction zone 45 is always maintained at the lift line pressure. Lock vessel 40 is pressured by admitting steam thereto through line 42 controlled by valve 42a. In the depressuring cycle steam is discharged through line 43, controlled by valve 43a. Valves 42a and 43a are automatic cycle valves timed to open and close at alternate closings of valves 47 and 48.

In the modification illustrated herein the lift line 46 serves also as the catalyst regeneration zone. The granular catalyst is circulated from the bottom of the reactor to the top thereof as a moving, compact, unfluidized bed of solids, and at the same time is regenerated by including in the lift gas a small amount of air or oxygen, e. g. 1% to 5% by volume of pure oxygen, in order to remove carbon and sulfur deposits therefrom. Sufficient oxygen should be included in the lift gas to provide a residual of about 0.5 to 1.0% thereof in the spent lift gas. During conveyance, the granular solids are maintained in a substantially compact, unfluidized condition of bulk or apparent density which is substantially the same as the bulk density of the granular catalyst flowing in the reaction zone. To operate a lift line of this unusual nature it is necessary to provide an induction chamber 45 into which the granular solids discharge from the reaction zone, and wherein the conveyance conduit opening 50 is submerged by the granular solids. With this type of lift line the pressure drop from the induction to the discharge end of the lift line is considerably greater than in ordinary gas lift lines, hence the necessity for lock chamber 40.

Induction chamber 45 is pressured with a mixture of air and flue gases for example which are pumped in through line 51, after being heated to the desired combustion temperature in heater 52, by means of pump 53. It is also essential in this "mass flow" type of lift line that the outlet end thereof should be restricted so as to hinder the discharge of solids therefrom without effecting any substantial restriction on the discharge of the conveyance gas which thus depressures concurrently with the emergence of solids from the outlet 55. This restriction on the emergence of the solids may be obtained by positioning a plate 56 a few inches above the outlet end of the lift line. The conveyance gas which is separated from the solids in gas-solids separator 57 is removed through line 58 and may then be utilized in waste heat boiler 59 to generate heat for the process. Part of the spent lift gas may be recycled through line 60 to be admixed with additional air in line 61 and again utilized as lift gas. The pressure in gas solids separator 57 is preferably substantially the same as that in the reactor, and hence the solids may be allowed to flow by gravity through conduit 65 into the top of the reactor without employing intervening valves.

The pressure gradient existing along the length of the lift line illustrated is substantial and exceeds by many times the pressure drop characteristic of the conventional pneumatic solids conveyance in which fluidized or suspended solids are transferred. To secure movement of the solids it is necessary to establish and maintain a conveyance force ratio, defined below, which exceeds a value of 1.0 throughout the length of the conveyance zone. The conveyance force ratio is defined as:

$$\frac{\frac{dp}{dl}}{\rho_s \cos \theta}$$

wherein $dp/dl$ is the pressure gradient in pounds per square foot per foot of conveyance zone length, $\rho_s$ is the apparent bulk density of the compact unfluidized granular solids in pounds per cubic foot, and $\theta$ is the angle of inclination of the conveyance conduit, measured from a vertical axis. A conveyance fluid is passed through the conveyance zone which is filled with a moving, compact, unfluidized, permeable mass of granular solids. This fluid flow through the tortuous flow paths comprising the connecting interstices between the granular solids generates a substantial pressure drop in the direction of flow which establishes a conveyance force on each individual granular solid in the same direction. When the conveyance force ratio of 1.0 is exceeded, the entire compact mass moves in the direction of conveyance fluid flow. Circulation rates of the order of 20,000 to 30,000 pounds of catalyst per hour may be easily attained in conveyance conduits 4 to 6 inches in diameter. The conveyance is effected in the total absence of moving mechanical devices thus eliminating a difficult maintenance problem and permitting solids conveyance at high temperatures and substantial superatmospheric pressures of as high as 1,000 to 1,500 pounds per square inch or higher.

The solids entering reactor 1 through inlet 36 should preferably be at not more than about 800° F. This temperature may be easily controlled by varying the proportion of air to flue gas in the lift line, and may be controlled further by means of a sealing gas such as steam which may be introduced into solids conduit 65 from line 66. The sealing gas is to prevent any of the combustible reaction gases from passing upwardly into separator 57. The admission of steam is controlled for example by means of a valve 67 which is operated by means of differential pressure controller 68, which in turn is responsive to the differential pressure in separator 57 and reactor 1. In this manner the pressure in separator 57 may be kept very slightly higher than that in reactor 1, whereby most of the steam introduced through line 66 will flow downwardly and out of the reactor, along with the reaction products in line 68.

It is not essential that catalyst regeneration be carried out in the lift line. If desired, the spent catalyst may be transferred from the bottom of the reactor by any conventional solids conveyance to a separate regenerator which may be operated at low pressures, and after burning off carbonaceous deposits therein, the regenerated catalyst is then transferred to the top of reactor 1 in any conventional manner, or by means of the mass flow lift line described herein. If a separate regenerator is employed, both the inlet conduit and the outlet conduit may be of the mass flow type, employing inert gases such as steam or flue gas as the conveyance fluid.

Having now described the flow of solids in the process, an illustrative case will be described showing the circulation of gases and feed stocks through the apparatus and the recovery of products therefrom. The primary feed stock employed consists of naphtha or gasoline stocks, either straight run, cracked or blends thereof which are suitable reforming stocks. Preferably they should be high in naphthenes, e. g. between 10% and 80% by volume, and should boil within the range of about 200–400° F. If naphtha alone is being treated it is preferred to employ a blend of cracked and straight run stocks, whereby the hydrogen derived by dehydrogenation of naphthenes in the straight run stock is partially or mostly consumed in hydrogenation of olefines in the cracked stock. If gas oils are being conjointly treated as described hereinafter, it is preferred to employ a highly naphthenic naphtha stock, such as one consisting wholly or predominantly of straight run gasoline. The naphtha feed stock is introduced through line 70, preheated in heater 71 to a temperature of about 800–1100° F. and transferred via line 72 to the feed gas engaging zone 33. Recycle gas, which may contain from e. g. 25% to 99% hydrogen, is preheated in heater 73 to the reaction temperature and transferred to the reactor through line 74 and gas engaging zone 34. Introducing the recycle gas at a point below the feed entry is advantageous in that it permits the descending catalyst to be stripped of adsorbed hydrocarbons by the rising recycle gas. To obtain still more effective stripping part of the recycle gas may be diverted from line 74 and passed into lower gas engaging zone 35 via line 75. Nearly all of the hydrogen passes upward countercurrently to the catalyst, but a small part thereof may leak downwardly past feeder plate 37 and into the surge zone 41. Upwardly rising steam from lock vessel 40 which leaks past valve 47 will mingle with the hydrogen in surge zone 41, and a small slip stream of this mixture may be continuously withdrawn through line 76, condensed in condenser 77 and separated in gas-liquid separation vessel 78. The hydrogen recovered is taken off through line 79, and may be admixed with the recycle gas entering the reactor through line 80. Actually condenser 77 may be the same as condenser 91, whereby the slip stream in line 76 is treated along with the product gases.

The upflowing stream of gases formed at gas distributor 33 flows upwardly through first reaction zone 81 wherein the reforming is initiated. If the naphtha employed contains any appreciable amount of olefines, there will be a sharp exothermic rise in temperature upon initial contact with the catalyst in the first part of reaction zone 81, due primarily to olefine hydrogenation. However, the hydrogenation reactions are rapid, and since the slower reforming reactions which soon predominate in reaction zone 81 are endothermic, the temperature again drops to e. g. about 800° F. This temperature drop tends to stop the reforming reactions. Hence the major portion of the reaction gases emerging into gas disengaging zone 15 are withdrawn and passed through heater 30 to reheat them to approximately their initial temperature or higher, and they are then readmitted to gas engaging zone 21 wherein they mingle with the small proportion of gases rising through the sealing leg of divider 8. The reheated gases then flow upwardly through reaction zone 82 wherein a similar, but not so rapid, temperature drop occurs. The resulting gases are then removed from gas disengaging zone 14, passed through heater 29 back to approximately their initial temperature, and readmitted to gas engaging zone 20. In a similar manner, the gases rise successively through reaction zone 83, heater 28, reaction zone 84, heater 27, reaction zone 85, heater 26 and reaction zone 86. It will be noted that in each case the successive reaction zones increase in volume, thereby compensating for the decreasing amount of reforming taking place, and providing optimum temperature control.

Reaction zone 86 constitutes the last reforming zone through which the reaction vapors pass. In all of the separate reforming zone described the temperature should be maintained between about 800° and 1100° F., and preferably between about 850° and 900° F. Within these ranges the actual temperature profile along the length of the reactor may be controlled so as to give either isothermal operation, or there may be a slightly rising temperature in the direction of gas flow.

If the catalyst which flows downwardly into reaction zone 86 contains adsorbed gas oil from an operation to be subsequently described, it may be preferable to maintain reaction zone 86 at a somewhat lower temperature than zone 85. This is to provide optimum conditions for gas oil stripping with a minimum of cracking. For this purpose reaction zone 86 may be maintained at between about 750°–850° F.

The vapors which rise upwardly into gas disengaging zone 10 may then be treated by two alternative procedures. According to one alternative, employing a single naphtha feed stock, the vapors are removed and passed through heat exchanger 25, which in this case is operated as a cooler to cool the reaction gases down to the desulfurization temperature, i. e. 550°–800° F. The cooled mixture then is returned to gas distributing zone 16 and continues to flow upwardly through desulfurization zone 87. Since hydrodesulfurization is an inherently faster reaction than the typical reforming reactions, the residence time in the desulfurization zone is preferably substantially less than in the reforming zones. Preferably the residence time in desulfurization zone 87 should be between about 0.1 and 0.6 of the total residence time in the previous reforming zones.

If the naphtha conversion is being operated with the preferred conjoint desulfurization of gas oil, the latter feed stock is preferably admixed with the naphtha vapors in gas disengaging zone 10. The entering gas oil passes through line 88, and is preheated in heater 89 to about 550°–650° F., and the resulting mixture of liquid and gas is then introduced through line 90. Preferably the mixture is sprayed into gas disengaging zone 10 from one or more nozzles distributed around the periphery of the reactor. By introducing the gas oil at the proper temperature and atomizing it into the naphtha vapors it is possible to cool the latter to the desired desulfurization temperature without resorting to extraneous cooling devices. Ordinarily however some additional cooling is necessary because the volume of rising naphtha vapors plus recycle gas is generally large compared to the quantity of gas oil admitted. In any event the admixed vapors will pass upwardly into desulfurization zone 87, either through the sealing leg of divider 3, cooler 25 or both.

In either of the above alternative modes of operation, employing naphtha or naphtha plus gas oil, the reaction conditions maintained in desulfurization zone 87 will be substantially the same. Since the desulfurization reaction is exothermic additional coolers, not shown, may be provided in zone 87. Alternatively the gases may simply be introduced at a sufficiently low temperature, e. g. 600° F. that there will be no excessive temperature rise therein.

The gases which emerge into gas disengaging zone 9 now consist principally of reformed naphtha vapors, gas oil vapors if a gas oil feed is employed, hydrogen, hydrogen sulfide, ammonia and small amounts of water vapor, methane, ethane, propane, etc. This reactor effluent is withdrawn through line 68 at a temperature of about 700° F. and is condensed and cooled in heat exchanger 91 to a temperature of e. g., about 110° F. The cooled reactor effluent then passes through line 92 at a pressure of for example 370 p. s. i. g. into a dropout drum 93. A liquid level is maintained therein and any traces of water in the effluent are drawn off through line 94. The dewatered, liquid reactor effluent is then drawn off through line 95, either water washed in countercurrent water extraction column 95a to remove H2S and other water soluble impurities, or transferred directly to the mid-portion of hydrogen enrichment absorption column 96 through line 95b. The gas phase from dropout drum 93 is taken off through line 97, passed through a second dropout drum 97, and thence through line 98, is admitted at a point slightly below the middle of absorption column 96 in which it rises countercurrently to descending absorption oil derived as hereinafter described. This absorption oil, which is a degassed, and preferably water washed reactor effluent, passes downwardly countercurrently to the rising stream of gases. A substantial proportion of the hydrocarbon gases are absorbed in the down-flowing absorption oil leaving an unabsorbed gas rich in hydrogen which forms the recycle gas stream employed in the process. The oil absorption in column 96 also removes most of the H2S from the recycle gas.

The stripped recycle gas is removed through line 99 and either recycled directly to the conversion zones via line 100, or is first passed through an aqueous or aqueous alkaline scrubber 101 to further remove hydrogen sulfide. Ordinarily, the scrubbing step in scrubber 101 is unnecessary, since the absorber oil absorbs nearly all the H2S in absorber 96. In any event the recycle gas then passes through line 102 and line 80 to the bottom of reactor 1. If make-up hydrogen is needed the required amount may be injected from line 102a. A portion of the recycle gas may be diverted through line 103 and admitted to the top of reactor 1 to reduce the catalyst entering the reactor, and to strip it of any adsorbed steam admitted through line 66. It has been found that steam is highly undesirable in the process described herein.

The enriched oil phase from absorber 96, which may be at a pressure of about 450 p. s. i. g., is taken off through line 105 and depressured to e. g. about 145 p. s. i. g. into flash chamber 106. Traces of water may be removed therefrom through line 107. The resulting gas phase is taken off through line 108, repressured to the pressure in absorber 96 and readmitted thereto at a point below the first gas inlet line 98. In this manner any small remaining traces of absorbed hydrogen in the gases from flash chamber 106 may be recovered. The hydrocarbon constituents of this gas are largely absorbed, and the operation serves to rectify the oil phase in absorber 96 to displace absorbed hydrogen therefrom.

In conventional rectified oil absorption, the rich oil is heated to liberate absorbed gases in the bottom of the absorber column. However, it has been found that greater quantities of absorbed hydrogen can be liberated from the rich absorption oil by the depressing steps of this invention in the total absence of heating than with heated absorption oil. This is contrary to the usual rich oil stripping operations in which heating of the rich oil assists the liberation of the absorbed materials. Any liberated hydrocarbon gases are readily soluble in the lower or rectifying section of column 96 below the reactor effluent inlet at the low temperatures maintained therein, while the hydrogen is of lower solubility than if the oil were hot and passes upward and becomes the hydrogen-rich recycle gas referred to above.

The liquid hydrocarbon phase from flash drum 106 is divided into two streams, one of which is taken off through line 109 and depressured to e. g. 15 p. s. i. g. into a third flash drum 110. Any remaining traces of water are withdrawn through line 111, and the liquid hydrocarbon phase, which then constitutes a relatively gas-free portion of the reactor effluent is removed through line 112 and repressured to the pressure of absorption column 96. It is then admitted to the top of absorption column 96 to serve as the absorption oil heretofore described.

The gas phase formed in third flash drum 110 is taken off through line 113 and passed into the bottom of a make gas absorption column 114, the operation of which is described subsequently.

The second portion of the hydrocarbon stream from flash drum 106 is taken off through line 115, and constitutes the principal product flow line, which is now substantially free from hydrogen and lower hydrocarbon gases. This material is then treated to remove any residual traces of hydrogen sulfide, propane, butane, etc. and to either separate the naphtha into a light naphtha and a heavy naphtha stock if only naphtha was employed as the original feed, or into a full range naphtha and a desulfurized gas oil in the case employing dual feed stocks.

To accomplish the foregoing the liquid hydrocarbon stream in line 115 is admitted to a depropanizer column 116. The overhead from this column passes through line 117, condenser 118 and reflux accumulator 119. Light gases and hydrogen sulfide are taken from accumulator 119 through line 120, and the condensed hydrocarbon phase from accumulator 119 is returned to the column as reflux through line 121. The bottoms stream from depropanizer 116 is taken off through line 122 and transferred to a second distillation column 123.

Column 123 may be operated at atmospheric pressure and is operated primarily to either fractionate naphtha into light and heavy cuts, or to separate a full range naphtha from the gas oil cut. If the column is operated with a simple naphtha feed, the overhead taken off through line 124 may be at about 270° F. This overhead is condensed and passed into a reflux accumulator 125 from which any small remaining traces of light gases are removed through line 126, and from the bottom of which a reflux stream is returned through line 127. Another portion of the liquid in accumulator 125 is taken off through line 128 and constitutes light naphtha boiling between about 175° and 300° F. To obtain the heavy naphtha cut, a side stream is removed through line 129 from the mid-portion of column 123 and pumped to a heavy gasoline side stripper 130. Stripping steam is introduced through line 131 to strip out vapors of light gasoline. The mixture of water vapor and light gasoline going overhead is recycled to column 123 through line 132. The stripped heavy gasoline is taken off as bottoms through line 133. The heavy naphtha fraction may have a boiling range of about 320–420° F.

The bottoms product from distillation column 123 is removed through line 134 and split into two streams, one of which is removed from the process through line 135. This stream comprises residual oil which may have a gravity of 16° API. The second portion of the bottoms from column 123 is taken off through line 136, through cooler 137, line 138 and into the top of make gas absorption column 140. This stream constitutes an absorption oil to recover gasoline range hydrocarbons from the gas resulting from the third stage flashing of the reactor effluent in flash drum 110 as described above. Make gas absorber 140 may operate at a pressure of about 175 p. s. i. g., and may be provided with bubble cap contacting trays. The unabsorbed hydrocarbon gas is removed from the top of the column through line 141, and may have an average molecular weight of about 26, consisting primarily of methane and ethane. In order to increase the efficiency of absorption column 140 a portion of the descending absorption oil may be withdrawn from the mid-portion of the column and passed through a cooler 142 and returned to the column at a somewhat lower point. By this means the temperature of the absorption oil may be reduced for example from about 130° F. to 100° F. The make gases from flash drum 110 are introduced into the bottom of absorption column 140 through line 113.

The rich absorption oil accumulating in the bottom of column 140 is drawn off through line 143 and transferred to a flash drum 144 wherein the disengaged hydrocarbon vapors are removed through line 145 and returned to the bottom of the make gas absorber 140. The rich liquid phase hydrocarbons remaining in drum 144 are withdrawn through line 146, and recycled to the incoming feed in line 115 to depropanizer column 116. In this manner the rich absorption oil is degassed and treated for recovery of its absorbed gasoline range hydrocarbons.

In cases where a dual feed stock is employed, the only significant difference in the recovery system consists in the temperature range at which column 123 is operated, and the temperature of the cut points therein. To remove overhead a full range naphtha, the column may be operated so as to maintain an overhead temperature of about 300–325° F. and a bottoms temperature of about 600° F. The column temperature at take-off line 129 may be about 500° F., and the resulting gas oil stream is stripped in column 130 to remove naphtha vapors as previously described, and the bottoms product removed through line 133 will then consist of the gas oil fraction boiling in the range of about 400° to 700° F.

Many variations in the above procedure may be incorporated without departing from the inventive concepts. It will be understood also that many of the ordinary engineering details have been omitted in the above description in order to simplify and shorten the description. However, those skilled in the art will readily understand for example that wherever heating and/or cooling steps are specified, appropriate interchangers will be provided so that there will be a minimum of heat loss in the process.

If naphtha stocks alone are employed in the above process the feed rates may range between about 0.2 and 10.0 volumes of liquid feed stock per volume of catalyst per hour, and preferably between about 0.5 and 1.5 The catalyst/oil weight ratio may be between about 0.02 and 3.0, and preferably between about 0.1 and 1.0. Recycle gas rates may range between about 500 and 10,000 s. c. f. of hydrogen per barrel of feed stock, and preferably between about 1000 and 500 s. c. f. per barrel. Straight run naphthas will require less recycle hydrogen than cracked stocks.

If gas oil is employed, the liquid volume ratio of naphtha to gas oil may range between about 10/1 and 1/10, and preferably between about 2/1 and 1/5. Gas oil feed rates may vary between 0.5 and 50, and preferably between about 1 and 2.5 volumes of liquid feed stock per volume of catalyst per hour in conjunction with the naphtha feed rates set forth above. In utilizing gas oil feed stocks, the hydrogen recycle rates should be somewhat higher than where naphtha alone is employed, assuming that straight run naphtha is being used in each case. Suitable recycle rates may range between about 1000 and 20,000, and preferably between about 1500 and 10,000 s. c. f. of hydrogen per barrel of gas oil.

In either of the above cases, whether naphtha or naphtha plus gas oil is being treated, the vapor residence time in the desulfurization zone should be between about 0.05 and 0.8 of the vapor residence time in the reforming zone, and preferably between about 0.1 and 0.6.

Catalytic materials which may be employed in the process described herein include the oxides or sulfides of vanadium, chromium, molybdenum and tungsten either used alone or in conjunction with other oxides or sulfides such as nickel oxide, cobalt oxide, copper oxide, cobalt sulfide, etc. The preferred catalyst is one containing cobalt oxide and molybdenum oxide, wherein a part or all of those oxides may be combined in the form of cobalt molybdate. This active composite may be employed either alone or supported on a carrier. If a carrier is employed the quantity of catalytic agent on the finished catalyst normally is in the range from about 5% to 40% by weight, and preferably in the range from about 7% to 15%. The carrier may be any one of the known refractory oxides including silica, titania, alumina, thoria, zirconia, or mixtures thereof. Of particular merit and preferred in this process is a carrier of alumina containing about 5% silica in addition to the catalytic agent.

The preferred method for preparing the catalysts used in the present invention includes the steps of drying the granular carrier at 100° C., calcining for about two hours at 600° C., impregnating the carrier with a sodium-free aqueous solution containing a soluble compound of the active metal or metals, evaporating the residual water from the drained carrier at 100° C., and finally calcining for 2 to 6 hours at 600° C. When a mixture of elements is employed, as in cobalt oxide-molybdenum oxide catalysts, two or more successive impregnation steps are preferably employed, each followed by a drying and a calcinating step.

Applied to catalytic reforming, these catalysts effect isomerization, hydrogenation, hydrocracking, desulfurization, denitrogenation, and aromatization reactions at temperatures between about 700° F. and 1100° F. When sulfur-bearing stocks are treated, a molybdenum oxide catalyst forms metal sulfides on the catalyst. These sulfides are converted to sulfur dioxide on regeneration. The other catalysts named usually reduce the sulfur of the feed to hydrogen sulfide, which is produced with the product. The process of this invention utilizes each of these catalysts with little modification in procedure.

While any of the foregoing catalysts may be employed in the process of this invention, it has been found that catalysts containing cobalt and molybdenum oxides are extremely effective for carrying out the reforming, aromatization, desulfurization and denitrogenation reactions of the process and are therefore the preferred catalysts. Supported cobalt molybdate type catalysts are extremely resistant to sulfur and nitrogen poisoning, and at the same time possess the necessary physical ruggedness to permit their use in a moving bed type operation. Furthermore, the hydrogenation rate in the presence of a cobalt molybdate catalyst is extremely rapid and the naphthene aromatization rate is high, with the result that extremely fine temperature control can be attained by the reaction zone interheating steps according to the methods described, such as is not so readily obtainable with other catalysts.

Cobalt molybdate catalysts in general comprise mixtures of cobalt and molybdenum oxides wherein the molecular ratio of CoO to $MoO_3$ is between about 0.4 and 5.0 and are prepared as described below. This catalyst may be employed in unsupported form or alternatively it may be distended on a suitable carrier such as alumina, silica, zirconia, thoria, magnesia, magnesium hydroxide, titania or any combination thereof. Of the foregoing carriers it has been found that the preferred carrier material is alumina, and especially alumina containing about 3–8% by weight of silica.

In the preparation of the unsupported cobalt molybdate, the catalyst can be coprecipitated by mixing aqueous solutions of, for example, cobalt nitrate and ammonium molybdate, whereby a precipitate is formed. The precipitate is filtered, washed, dried and finally activated by heating to about 500° C.

Alternatively, the cobalt molybdate may be supported on alumina by coprecipitating a mixture of cobalt, aluminum and molybdenum oxides. A suitable hydrogel of the three components can be prepared by adding an ammoniacal ammonium molybdate solution to an aqueous solution of cobalt and aluminum nitrates. The precipitate which results is washed, dried and activated.

In still another method, a washed aluminum hydrogel is suspended in an aqueous solution of cobalt nitrate and an ammoniacal solution of ammonium molybdate is added thereto. By this means a cobalt molybdate gel is precipitated on the alumina gel carrier.

Catalyst preparations similar in nature to these and which can also be employed in this invention have been described in U. S. Patents 2,369,432 and 2,325,033.

Still other methods of catalyst preparation may be employed such as by impregnating a dried carrier material, e. g. an alumina-silica gel, with an ammoniacal solution of cobalt nitrate and ammonium molybdate. Preparations of this type of cobalt molybdate catalyst are described in U. S. Patent 2,486,361.

In another method for preparing impregnated cobalt molybdate catalyst the carrier material may be first impregnated with an aqueous solution of cobalt nitrate and thereafter impregnated with an ammoniacal molybdate. Alternatively, the carrier may also be impregnated with these solutions in reverse order. Following the impregnation of the carrier by either of the foregoing methods the material is drained, dried and finelly activated in substantially the same manner as is employed for the other catalysts.

In the preparation of impregnated catalysts where separate solutions of cobalt and molybdenum are employed, it has been found that it is preferable to impregnate the carrier first with molybdenum, e. g., ammoniacal ammonium molybdate, and thereafter to impregnate with cobalt, e. g., aqueous cobalt nitrate, rather than in reverse order.

In another method for the preparation of suitable catalyst, a gel of cobalt molybdate can be prepared as described hereinbefore for the unsupported catalyst, which gel after drying and grinding can be mixed with a ground alumina, alumina-silica or other suitable carrier together with a suitable pilling lubricant or binder which mixture can then be formed into pills or other types of particles and activated.

In another modification, finely divided or ground molybdic oxide can be mixed with a suitably ground carrier such as alumina, alumina-silica and the like in the presence of a suitable lubricant or binder and thereafter pilled or otherwise formed into larger agglomerated particles. These pills or particles are then subjected to a preliminary activation by heating to 600° C. for example, and are thereafter impregnated with an aqueous solution of cobalt nitrate to deposit the cobalt compound thereon. After draining and drying, the particles are heated to about 600° C. to form the catalyst.

The following examples may serve to illustrate the beneficial results obtainable by employing the particular procedures described above. These examples should not however be considered as limiting in scope.

Example I

A reactor similar to that shown in the drawing, embodying six heat exchangers, is constructed having the following critical dimensions:

| | | |
|---|---|---|
| Over-all height | feet | 31.3 |
| Inside diameter | inches | 7.6 |
| Approximate length of: | | |
| Reaction zone 81 | feet | 1.6 |
| Reaction zone 82 | do | 1.9 |
| Reaction zone 83 | do | 2.1 |
| Reaction zone 84 | do | 2.5 |
| Reaction zone 85 | do | 2.75 |
| Reaction zone 86 | do | 3.2 |
| Reaction zone 87 | do | 4.65 |

The volume ratio of reaction zone 87 (desulfurization zone) to the remaining reaction zone space (reforming zones) is 0.325. The four intermediate heat exchangers are flue-gas heated, while the upper and lower heat exchangers 25 and 30 are operated as coolers in heat exchange relationship with the feed gases.

Granular catalyst, in the form of 3/16" pellets, and consisting of 8% by weight molybdenum oxide and 4.0% by weight of cobalt oxide separately impregnated via aqueous solutions of their salts onto the previously pelleted and activated alumina carrier, is employed. This catalyst is introduced as a compact stream at the top of the reactor at about 750° F. and flows downwardly at the rate of 10 to 20 lbs. per hour. The catalyst is continuously regenerated in the lift line, wherein the conveyance-fluid is a flue gas containing about 2.0% oxygen and the pressure drop from induction chamber 45 to separator 57 is about 50 p. s. i. g.

A feed blend of Santa Maria Valley pressure distillate and Los Angeles basin straight-run naphtha having an API gravity of 49.9, a boiling range of 150–406° F., containing 1.5 weight percent sulfur and having a research octane rating of 67.4 (clear) and 76.4 (leaded), is vaporized and introduced into feed engaging zone 33 at 860° F., and at a rate of 12 bbls./day. Recycle gas containing 70 vol. percent hydrogen is introduced into gas engaging zones 34 and 35 at the rate of 3000 s. c. f./bbl. of feed. The pressure at the feed engaging zone is about 400 p. s. i. g. These flow rates provide a cat./oil weight ratio of about 0.15 and a space velocity of about 0.5 volumes of liquid feed stock per volume of catalyst per hour.

As the feed gases mingle with the rising recycle gas in reaction zone 81, the temperature initially rises rather sharply to about 920° F. due to exothermic hydrogenation. By disengaging the major proportion of gases at gas disengaging zone 15 and passing them through intercooler 30, and readmitting the cooled gases to gas engaging zone 21, the mixture of rising gases is brought to a temperature of about 890° F. By this time most of the olefines are hydrogenated, and endothermic dehydrogenation reactions predominate. Consequently there is a marked temperature drop in reaction zone 82, to about 850° F., which is compensated for by interheater 29. In a similar manner the endothermic temperature drops in reaction zones 83, 84 and 85 are compensated by interheaters 28, 27 and 26 respectively to provide a substantially isothermal temperature profile between about 850° and 900° F. up to the top of reaction zone 86.

Heat exchanger 25 is then operated to cool the gases, so that the mixture formed in gas engaging zone 16 will be at a temperature of about 700° F. There is a slight temperature rise in reaction zone 87 due to several factors, including the exothermic desulfurization reactions taking place, and the reactor effluent is taken off at a temperature of about 740° F.

The product is cooled to about 110° F. and depressured into a flash drum to recover recycle gases. The lower liquid water phase is removed by decantation and discarded, and the supernatant liquid hydrocarbons are removed and washed with water at about 370 p. s. i. g. and sent to a depropanizer column. Part of the bottoms product from the depropanizer is employed to scrub the recycle gases at about 370 p. s. i. g. in an absorber column. Rich oil from the bottom of the absorber is mixed with the feed to the depropanizer column. The net bottoms from the depropanizer comprises a depropanized and largely debutanized naphtha having the following characteristics:

| | |
|---|---|
| API gravity | 55.2 |
| Liquid yield, vol. percent of feed | 94.5 |
| Octane No. (research clear) | 81.4 |
| Octane No. (research, +3 ml. TEL) | 93.8 |
| Sulfur, weight percent | 0.003 |
| Mercaptan sulfur, titrametric weight percent | 0.00030 |

By repeating the above procedure as described except that heat exchanger 25 is operated as a heater to maintain reaction zone 87 at a reforming temperature of about 875° F. the product naphtha recovered is found to have characteristics similar to the above product except that the liquid yield is only 93.6%, and it contains 0.004% total sulfur and 0.00075% mercaptan sulfur and is therefore sour.

This example shows that by treating the naphtha reformate from a high temperature reforming zone in a lower temperature desulfurization zone, a substantially doctor-sweet, low sulfur product is obtained. In addition it is observed that the liquid yield is higher when the catalyst is first contacted with the gases at low desulfurization temperatures than when the freshly regenerated catalyst immediately contacts the gases at high reforming temperatures.

Example II

This example shows the results which may be obtained when a gas oil feed stock is processed conjointly with a straight-run naphtha feed stock. The reactor and the catalyst are the same as described in Example I. The gas oil is a coker distillate obtained from a Santa Maria Valley crude, has an API gravity of 24.5, a boiling range of 320° to 760° F., (93% end point), contains 3.8% by weight of sulfur and 0.24%, by weight of nitrogen. The naphtha employed is a straight run stock obtained from a Los Angeles basin crude, and has an API gravity of 49.8, a boiling range of 217–420° F., a research octane rating of 59.5 (clear) and 76.0 (leaded), and contains 0.02% by weight of sulfur. The critical process conditions are as follows:

| | | |
|---|---|---|
| Catalyst flow rate | lbs./hr. | 19 |
| Naphtha feed rate | bbls./day | 10.4 |
| Gas oil feed rate | bbls./day | 5.0 |
| Recycle gas feed rate | s. c. f./bbl. naphtha | 3000 |
| Average temp. of reaction zones 81, 82, 83, 84, 85 and 86 | | 875–900 |
| Average temperature of reaction zone 87 | °F | 700–725 |
| Inlet temperature of gas oil feed | °F | 700 |
| Outlet temperature of reaction products | °F | 712 |
| Average pressure in reactor | p. s. i. g. | 400 |
| Catalyst/gas oil wt. ratio | | 0.28 |
| Catalyst/naphtha wt. ratio | | 0.16 |
| Gas oil liquid hourly space velocity | | 1.0 |
| Naphtha liquid hourly space velocity | | 0.5 |

The reactor effluent is cooled and depressured into a flash drum to separate recycle gas which is scrubbed by oil absorption to remove hydrocarbon gases and hydrogen sulfide as outlined in Example I, with the exception that no water wash is employed. The liquid product is fractionated to remove dry gases ($C_1$—$C_3$) and $H_2S$, and is then further fractionated to recover an overhead consisting of full range naphtha boiling between 130° and 400° F., and a gas oil bottoms boiling between about 400° and 760° F. The over-all liquid product yield ($C_4+$) is 95.8 vol. percent of the total feed. The naphtha recovered (64.3 vol. percent of total liquid product) is as follows:

| | |
|---|---|
| API gravity | 50.4 |
| Octane No.: | |
| Research, clear | 85.2 |
| Research +3 ml. TEL | 91.8 |
| Sulfur, percent by weight | 0.009 |
| Mercaptan sulfur, percent by weight | 0.0003 |

The gas oil recovered (35.7 vol. perecent of total liquid product) is as follows:

| | |
|---|---|
| API gravity | 29.1 |
| Sulfur, percent by weight | 0.5 |
| Nitrogen, percent by weight | 0.15 |

This example shows that by the conjoint processing of naphtha and gas oil in a single reactor, high liquid yields of doctor-sweet, high octane naphtha may be obtained, along with high liquid yields of desulfurized, denitrogenated gas oil. The light gas oil recovered from this operation is found to meet all specifications for diesel fuels. This combined operation is highly attractive economically, since it provides for efficient utilization of recycle gases, and avoids the conventional expense of constructing separate units for each operation. Considerable savings in catalyst cost are also realized since the catalyst attrition rate is cut down. Moreover, it will be noted that a doctor-sweet naphtha is obtained without employing water or alkaline washes, which represents a considerable saving in processing expense.

The gas oil stocks employed herein may be either light, heavy, or full range cuts, straight run or cracked stocks, or blends thereof, and may contain as high as 5% sulfur by weight. While the invention has been described with particular reference to gas oil as the secondary feed stock, other hydrogenatable petroleum or shale oil stocks may also be injected in place of the gas oil, as for example cracked naphthas, polymer gasoline, etc.

The foregoing disclosure of this invention is not to be considered as limiting since many variations may be made by those skilled in the art without departing from the scope or spirit of the following claims.

I claim:

1. A catalytic conversion process for reforming and desulfurizing a sulfur-containing mineral oil naphtha which comprises flowing a substantially compact stream of granular, sulfur-resistant hydroforming catalyst downwardly through a low-temperature desulfurization zone and then, without intervening regeneration, through a high-temperature reforming zone, contacting vapors consisting essentially of said naphtha in admixture with hydrogen first with the catalyst in said reforming zone at temperatures between about 800° and 1100° F. whereby said naphtha is substantially reformed into aromatics and other high-octane hydrocarbons, then contacting vapors from said reforming zone, without removing any of the components thereof, with the catalyst in said desulfurization zone at temperatures between about 550° and 800° F. whereby the hydrogen produced in said reforming zone is at least partially consumed in hydrodesulfurization reactions, and recovering high-octane, low-sulfur naphtha from the effluent gases from said desulfurization zone, said hydroforming catalyst comprising as an essential active ingredient a member selected from the class consisting of the oxides and sulfides of vanadium, chromium, molybdenum and tungsten.

2. A process as defined in claim 1 wherein the vapor residence time in said desulfurization zone is between about 0.1 and 0.6 of the vapor residence time in said reforming zone.

3. A process as defined in claim 2 wherein the total catalyst/oil ratio is between about 0.02 and 3.0 by weight.

4. A process as defined in claim 2 wherein the flow of feed vapors in said reforming zone and in said desulfurization zone is countercurrent to the flow of catalyst therein.

5. A catalytic conversion process for reforming and desulfurizing a sulfur-containing mineral oil naphtha conjointly with the desulfurization of a sulfur-containing gas oil which comprises flowing a substantially compact stream of granular, sulfur-resistant hydroforming catalyst downwardly through a low temperature desulfurization zone and then, without intervening regeneration, through a high temperature reforming zone, contacting vapors consisting essentially of said naphtha in admixture with hydrogen first with the catalyst in said reforming zone at temperatures between about 800° and 1100° F. whereby said naphtha is substantially reformed into aromatics and other high octane hydrocarbons with a consequent production of hydrogen, then contacting vapors from said reforming zone, without removing any of the components thereof but with the addition thereto of vapors of said gas oil, with the catalyst in said desulfurization zone at temperatures between about 550° and 800° F. whereby the hydrogen produced in said reforming zone is at least partially consumed in hydrodesulfurization reactions, and fractionating the effluent from said desulfurization zone to obtain high octane, low-sulfur naphtha and a higher boiling substantially desulfurized gas oil, said hydroforming catalyst comprising as an essential active ingredient a member selected from the class consisting of the oxides and sulfides of vanadium, chromium, molybdenum and tungsten.

6. A process as defined in claim 5 wherein the ratio of gas oil to naphtha feed stocks is between about 1/10 and 10/1 by volume.

7. A process as defined in claim 6 including the steps of recovering a hydrogen-rich gas from the effluent from said desulfurization zone, scrubbing said hydrogen-rich gas to remove hydrogen sulfide, and recycling at least a part of the washed gas to said reforming zone in admixture with naphtha feed stock.

8. A process as defined in claim 6 wherein said reforming catalyst consists essentially of a granular, gel-type alumina carrier containing minor proportions of molybdenum oxide and cobalt oxide.

9. A process as defined in claim 6 wherein the vapor residence time in said desulfurization zone is between about 0.1 and 0.6 of the vapor residence time in said hydroforming zone, and the total catalyst/oil weight ratio is between about 0.02 and 3.0.

10. In a catalytic reforming process wherein a sulfur-containing naphtha feed stock is contacted with a sulfur-resistant reforming catalyst in the presence of hydrogen at temperatures between about 800° and 1100° F., the improvement which comprises preconditioning said catalyst to selectively block deleterious cracking centers thereon by contacting the same in a desulfurization zone at temperatures between about 550° and 800° F. with product vapors from said reforming, and maintaining a catalyst/oil ratio of between about 0.02 and 3.0 in said desulfurization zone, said hydroforming catalyst comprising as an essential active ingredient a member selected from the class consisting of the oxides and sulfides of vanadium, chromium, molybdenum and tungsten.

11. In a catalytic desulfurization process wherein a sulfur-containing gas oil is contacted with a desulfurization catalyst in the presence of hydrogen at temperatures between about 650° and 800° F., the improvement which comprises stripping adsorbed gas oil from the partially inactivated catalyst which has been used in said desulfurization process without appreciably cracking said gas oil, said stripping being carried out by contacting said partially inactivated catalyst with a gaseous naphtha hydroforming effluent containing hydrogen and reformed naphtha, said stripping being carried out at temperatures between about 750° and 1100° F., and separating the stripped gas oil from said naphtha hydroforming effluent, said desulfurization catalyst comprising as an essential active ingredient a member selected from the class consisting of the oxides and sulfides of vanadium, chromium, molybdenum and tungsten.

12. A process as defined in claim 11 wherein said stripping is carried out in a plurality of stripping zones, the first of which is maintained at a relatively low temperature between about 750° and 875° F., and the succeeding stripping zones being maintained at relatively higher temperatures between about 875° and 1100° F.

13. A catalytic conversion process for reforming and desulfurizing a sulfur-containing mineral oil naphtha which comprises flowing a substantially compact stream of granular, sulfur-resistant hydroforming catalyst serially through a low temperature desulfurization zone, a plurality of high temperature reforming zones, a stripping zone, a regeneration zone, a hydrogen reduction zone and thence back to said desulfurization zone; contacting vapors of said naphtha in admixture with hydrogen countercurrently and serially with the catalyst in each of said reforming zones at substantially constant temperatures between about 800° and 1100° F., maintaining said temperature in said reforming zones by disengaging a major portion of the reaction gases at the top of each reforming zone and passing them through a heater and thence into the bottom of the superjacent reforming zone, whereby said naphtha is substantially reformed into aromatics and other high octane hydrocarbons, then disengaging a major portion of vapors from the topmost of said reforming zones, passing said disengaged portion through a cooler and thence into the bottom of a superjacent desulfurization zone, whereby the temperature in said desulfurization zone is maintained at between about 550° and 800° F., withdrawing gaseous reaction products from the top of said desulfurization zone and recovering a high octane, low sulfur naphtha therefrom, said hydroforming catalyst comprising as an essential active ingredient a member selected from the class consisting of the oxides and sulfides of vanadium, chromium, molybdenum and tungsten.

14. A catalytic conversion process for reforming and desulfurizing a sulfur-containing mineral oil naphtha conjointly with the desulfurization of a sulfur-containing gas oil which comprises flowing a substantially compact stream of granular, sulfur-resistant hydroforming catalyst serially through a low temperature desulfurization zone, a plurality of high temperature reforming zones, a hydrogen stripping zone, a surge zone, a regeneration zone, a steam stripping zone, a hydrogen reduction zone and thence back to said desulfurization zone; contacting vapors of said naphtha in admixture with hydrogen countercurrently and serially with the catalyst in each of said reforming zones at substantially constant temperatures between about 800° and 1100° F., maintaining said temperature in said reforming zones by disengaging a major portion of the reaction gases at the top of each reforming zone and passing them through a heater and thence into the bottom of the superjacent reforming zone, whereby said naphtha is substantially reformed into aromatics and other high octane hydrocarbons, injecting said gas oil into the gas disengaging zone immediately above the topmost of said reforming zones, then disengaging a major portion of mixed gas oil-naphtha vapors from said gas disengaging zone, passing said disengaged portion through a cooler and thence into the bottom of a superjacent desulfurization zone, whereby the temperature in said desulfurization zone is maintained at between about 550° and 800° F., withdrawing gaseous reaction products from the top of said desulfurization zone and cooling the same to condense normally liquid hydrocarbons, passing the gas-liquid condensate into a separator, separating lean recycle gas, liquid water, and a liquid hydrocarbon phase from said separator, fractionating said hydrocarbon phase to remove dry gases, countercurrently scrubbing said lean recycle gas with a portion of said degassed hydrocarbon phase to absorb light hydrocarbon gases from the lean gas, recycling at least a part of the resulting hydrogen-rich gas to said hydrogen stripping zone, recycling another part of said rich gas to said hydrogen reduction zone, recycling the rich oil from said absorber to said fractionating step, and recovering a substantially doctor-sweet naphtha and a substantially desulfurized gas oil by further fractionating the net production of degassed hydrocarbons from said fractionation, said hydroforming catalyst comprising as an essential active ingredient a member selected from the class consisting of the oxides and sulfides of vanadium, chromium, molybdenum and tungsten.

15. A process as defined in claim 14 including the steps of intermittently transferring the catalyst in said surge zone to a steam filled lock zone, thereby displacing steam upwardly into said surge zone, intermittently transferring catalyst from said lock zone to a high pressure induction zone, pressuring said induction zone with a regeneration-lift gas, simultaneously conveying and regenerating said catalyst in compact mass-flow to an upper separation zone positioned above said steam stripping zone, separating lift gas, flowing the regenerated catalyst into said steam stripping zone, allowing a part of the steam in said steam stripping zone to flow upwardly into said separation zone and a part thereof to flow downwardly into said hydrogen reduction zone, allowing the downflowing steam and the reduction hydrogen gases to flow downwardly to mingle and be withdrawn along with said gaseous reaction products.

16. A process as defined in claim 14 including the steps of transferring the catalyst in said surge zone to a lift line communicating with the top of a catalyst regenerator, regenerating catalyst in said regenerator by combustion with an oxygen containing gas, transferring regenerated catalyst to said steam stripping zone and said hydrogen reduction zone, and allowing a major portion of the steam and hydrogen from said steam stripping and hydrogen reduction zones to flow downwardly to mingle and be withdrawn along with said gaseous reaction products.

17. An apparatus for effecting hydrocarbon conversions in the presence of a moving bed of granular catalyst, said apparatus comprising an elongated, vertically disposed reaction vessel adapted to permit the downward flow of said catalyst as a substantially compact moving bed, a plurality of longitudinally spaced horizontal dividers positioned in said vessel, each of said dividers carrying a depending vertical sealing leg, thereby forming a gas-solids disengaging zone immediately below each of said dividers and surrounding said sealing legs, a gas engaging member positioned immediately above each of said sealing legs, each of said gas-engaging members communicating with the subjacent gas-solids disengaging zone through a gas conduit and a heat interchanger, the uppermost of said heat interchangers being a cooler and the remainder thereof being heaters, a solids inlet near the top of said reaction vessel and a solids outlet near the bottom thereof, a feed gas inlet positioned below the lowermost of said sealing legs, a stripping gas inlet positioned below said feed gas inlet, a second feed gas inlet communicating with the uppermost of said gas-solids disengaging zones, and a product gas outlet positioned above the uppermost of said gas-engaging members.

18. An apparatus as defined in claim 17 including means for intermittently discharging catalyst from said catalyst outlet into a surge zone, a lock vessel communicating with said surge zone through a cycle valve, an induction chamber communicating with said lock vessel through a cycle valve, a gas-lift line-catalyst regenerator communicating with the lower part of said induction chamber, a gas-solids separator enclosing the upper end of said lift line, a plate positioned immediately above the outlet end of said lift line adapted to restrict the flow of solids but to permit relatively free flow of gases therefrom, a solids conduit connecting said gas-solids separator with the solids inlet of said reaction vessel, a steam inlet positioned in the mid-portion of said solids conduit, means for alternately pressuring and depressuring said lock vessel when it is open and closed respectively to said induction chamber, and means for admitting regenerating lift gas to said induction chamber and maintaining a constant pressure therein higher than the pressure in said reaction vessel.

19. An apparatus as defined in claim 17 in combination with a catalyst regeneration vessel, a lift line for transferring catalyst from the catalyst outlet of said reaction vessel to an upper inlet in said regeneration vessel, combustion gas inlet and outlet ports in said regeneration vessel, a second lift line for transferring catalyst from the bottom of said regeneration vessel to the catalyst inlet of said reaction vessel, and means for dissipating the exothermic heat of spent catalyst regeneration.

20. A process as defined in claim 1 wherein said hydroforming catalyst consists essentially of a granular, gel-type alumina carrier containing minor proportions of molybdenum oxide and cobalt oxide.

References Cited in the file of this patent

UNITED STATES PATENTS

| | | |
|---|---|---|
| 2,414,951 | Jasaitis et al. | Jan. 28, 1947 |
| 2,417,308 | Lee | Mar. 11, 1947 |
| 2,542,970 | Jones | Feb. 27, 1951 |
| 2,647,076 | Haresnape et al. | July 28, 1953 |